United States Patent
Shimizu et al.

(10) Patent No.: US 7,167,237 B2
(45) Date of Patent: Jan. 23, 2007

(54) TEST SYSTEM FOR OPTICAL LINE WHICH CARRIES OUT FAULT SEARCH FOR OPTICAL LINE FROM USER OPTICAL TERMINAL SIDE

(75) Inventors: Masaya Shimizu, Atsugi (JP); Hiroaki Endo, Yokohama (JP); Takashi Sakamoto, Atsugi (JP)

(73) Assignee: Anritsu Corporation, Atsugi (JP)

( * ) Notice: Subject to any disclaimer, the term of this patent is extended or adjusted under 35 U.S.C. 154(b) by 82 days.

(21) Appl. No.: 10/524,067

(22) PCT Filed: Jun. 28, 2004

(86) PCT No.: PCT/JP2004/009464

§ 371 (c)(1),
(2), (4) Date: Feb. 8, 2005

(87) PCT Pub. No.: WO2005/003714

PCT Pub. Date: Jan. 13, 2005

(65) Prior Publication Data

US 2005/0271321 A1    Dec. 8, 2005

(30) Foreign Application Priority Data

Jul. 7, 2003    (JP) .............................. 2003-193154

(51) Int. Cl.
*G01N 21/00* (2006.01)
(52) U.S. Cl. ................................... 356/73.1
(58) Field of Classification Search ............... None
See application file for complete search history.

(56) References Cited

U.S. PATENT DOCUMENTS

| | | | |
|---|---|---|---|
| 5,177,354 A | | 1/1993 | Tomita et al. |
| 5,270,537 A | * | 12/1993 | Jacobs .................. 250/227.15 |
| 5,285,305 A | * | 2/1994 | Cohen et al. .................. 398/31 |
| 5,343,286 A | * | 8/1994 | Keeble et al. ............. 356/73.1 |
| 5,790,287 A | * | 8/1998 | Darcie et al. ............... 398/108 |
| 2002/0075534 A1 | | 6/2002 | Feldman |

FOREIGN PATENT DOCUMENTS

JP    2-94717 A    4/1990
JP    6-249750 A    9/1994

OTHER PUBLICATIONS

N. Araki et al; "Tests for Improving Reliability in Trunk Line"; on line, Jun. 1999, searched on Jun. 30, 2003; Internet. 10 pages.

* cited by examiner

*Primary Examiner*—Tu T. Nguyen
(74) *Attorney, Agent, or Firm*—Frishauf, Holtz, Goodman & Chick, P.C.

(57) ABSTRACT

A fault searching system searches for a fault in an optical line connected with an optical fiber carrying out data transmission between a transmission apparatus and a user optical terminal. A connecting unit detaches a terminal portion of the optical line at the user optical terminal, and connects an OTDR to the terminal portion of the optical line. At least one of a test light with a wavelength different from a wavelength of light used for data transmission in the optical line, and a test light whose peak level is less than or equal to a predetermined level, is caused to be incident upon the terminal portion of the optical line. A searching unit searches for a fault in the optical line from the user optical terminal side by detecting backward scattering light or return light from the optical line produced by the test light caused by the OTDR.

12 Claims, 5 Drawing Sheets

US 7,167,237 B2

TEST SYSTEM FOR OPTICAL LINE WHICH CARRIES OUT FAULT SEARCH FOR OPTICAL LINE FROM USER OPTICAL TERMINAL SIDE

This application is a U.S. National Phase Application under 35 USC 371 of International Application PCT/JP2004/009464 filed Jun. 28, 2004.

1. Technical Field

The present invention relates to a test system for an optical line, and in particular, to a test system for an optical line which carries out a fault search for an optical line, which is connected with an optical fiber carrying out data transmission from a transmission apparatus at a center station side via an optical divider such as a passive optical network (PON) up to a user optical terminal, from the user optical terminal side.

2. Background Art

Conventionally, as a fault searching system for an optical line passing through a PON as described above, a system has been known in which a place where a fault in the optical line arises is specified from the side of the center station by using an optical time domain reflectometer (OTDR) as an optical pulse tester which generates test light with a wavelength of 1.65 µm, as disclosed in "Tests for Improving Reliability in Trunk Line," by Norivuki Araki et al, online, June 1999, searched on Jun. 30, 2003.

In this system, in order not to influence original transmission signal light, optical filters cutting off only test light are inserted into both ends of the optical line.

Further, in the same way as in this system, as a fault searching system for an optical line using an OTDR, a system in which a place where a fault in the optical line arises is specified from the side of the center station as disclosed in Patent Document (U.S. Pat. No. 5,177,354) has been known.

However, because both of these fault searching systems for an optical line are techniques in which a place where a fault in the optical line arises is specified from the side of a center station which a communication carrier side providing an optical fiber has, in principle, it is extremely difficult to specify a place where a fault in the optical line arises from a user optical terminal side.

On the other hand, in Fiber to the Home (FTTH), because a mechanical splicing method is used for connecting between optical fibers at a user optical terminal and the front and rear of an optical divider from the standpoint of reducing the cost of laying an optical fiber, there is the problem that the bond strength between the optical fibers is weaker as compared with the case in which the optical fibers are connected by fusion splicing.

Therefore, in FTTH, there is a high possibility of a fault arising in an optical fiber laid between the inside of a user optical terminal and an optical divider.

Accordingly, in future, when demand for FTTH increases, there is a possibility that it will be impossible for only the fault searching system for an optical line, as described above, which carries out a test from a center station which a communication carrier side has, to cope with a communication fault which is brought about by a fault predicted to arise between the inside of a user optical terminal and an optical divider.

Therefore, among communication carriers using optical fibers, a demand for realizing a fault searching system for an optical line using a technique capable of promptly specifying the place where the fault has arisen when a fault in an optical fiber arises between the inside of a user optical terminal and an optical divider has been mounting.

DISCLOSURE OF INVENTION

An object of the present invention is to provide a fault searching system for an optical line which can rapidly detect a fault in an optical fiber laid as an optical line from a user optical terminal up to an optical divider, without affecting other user optical terminals and transmission apparatuses, from the user optical terminal side.

The gist of the present invention is to be capable of rapidly searching for a fault in an optical fiber laid as an optical line from a user optical terminal up to an optical divider, without affecting other user optical terminals and transmission apparatuses, from the user optical terminal side by connecting an OTDR being to a terminal portion of the optical line in the user optical terminal, and by using at least one of those in which a value of a wavelength used in the OTDR connected is set to a value different from a value of a wavelength used for data transmission in the optical line, and a peak level of an optical pulse is set to a predetermined level or less.

Note that the user optical terminal described in the present specification may be called an optical network terminating apparatus such as an optical network unit (ONU).

Then, the gist of the present invention as described above can be concretely realized by using the following aspects.

According to a first aspect of the present invention, there is provided a fault searching method for an optical line which searches for a fault in an optical line connected with an optical fiber carrying out data transmission between from a transmission apparatus at a center station side via an optical divider (PON) up to a user optical terminal comprising: preparing an OTDR which carries out a test for the optical fiber of backward scattering light or return light from the optical fiber by making test light be incident into the optical fiber; detaching a terminal portion of the optical line at an inside of the user optical terminal from the inside of the user optical terminal, and connecting the OTDR to the terminal portion of the optical line; making at least one of test light with a wavelength different from a wavelength of light used for data transmission in the optical line, and test light whose peak level is less than or equal to a predetermined level be incident upon the terminal portion of the optical line from the OTDR; and searching for a fault in the optical line from the user optical terminal side by detecting backward scattering light or return light from the optical line which is obtained based on the incidence of the test light by the OTDR.

In accordance with the first aspect, in the process of connecting the OTDR, the terminal portion of the optical line at the inside of the user optical terminal is detached from the inside of the user optical terminal, and the OTDR is connected to the terminal portion of the optical line, and in the process of making the test light be incident, at least one of the test light with a wavelength different from the wavelength of the light used for data transmission in the optical line, and the test light whose peak level is less than or equal to a predetermined level is made to be incident upon the terminal portion of the optical line from the OTDR, and in the process of searching for a fault in the optical line, a fault in the optical line is searched from the user optical terminal side by detecting a backward scattering light or a return light from the optical line which is obtained based on the incidence of the test light by the OTDR, and therefore, a fault in the optical fiber laid as the optical line between from each user optical terminal up to the optical divider can be rapidly searched for from the user optical terminal side without influencing the other user optical terminals and the transmission apparatus at the center station side.

According to a second aspect of the present invention, there is provided a fault searching method for an optical line, according to the first aspect, wherein the wavelength of the test light is a wavelength different from the wavelength of the light used for data transmission in the optical line, and is a wavelength different from a wavelength used for a test for the optical line from the center station side.

In accordance with the second aspect, an effect which is the same as in the first aspect described above can be achieved except for that the wavelength of the test light is a wavelength different from the wavelength of the light used for data transmission in the optical line, and is a wavelength different from a wavelength used for a test for the optical line from the center station side.

According to a third aspect of the present invention, there is provided a fault searching method for an optical line, according the second aspect, wherein the wavelength of the test light is a value included in one of ranges being greater than or equal to 0.3 μm and less than 1.3 μm, or greater than 1.65 μm and less than or equal to 2.0 μm.

In accordance with the third aspect, an effect which is the same as in the first aspect described above can be achieved except that the wavelength of the test light is specified, as a wavelength different from the wavelength of the light used for data transmission in the optical line, and a wavelength different from a wavelength used for a test for the optical line from the center station side, to be a value included in one of ranges being greater than or equal to 0.3 μm and less than 1.3 μm, or greater than 1.65 μm and less than or equal to 2.0 μm.

In this case, the OTDR may be an OTDR equipped with a variable or a plurality of wavelength light sources which selectively generate test light having a wavelength greater than or equal to 0.3 μm and less than 1.3 μm which is different from the wavelength of the light used for data transmission in the optical line in accordance with setting by the user, or a single light source which generates only test light having one wavelength thereamong.

Moreover, the OTDR may be may be an OTDR equipped with a variable or a plurality of wavelength light sources which selectively generate test light with a wavelength which is greater than or equal to 0.3 μm and less than 1.3 μm, or which is greater than 1.65 μm and less than or equal to 2.0 μm, which is different from the wavelength of the light used for data transmission in the optical line and which is different from the wavelength used for a test for an optical line from the side of the center station in accordance with setting by the user, or a single light source which generates only test light having one wavelength thereamong.

According to a fourth aspect of the present invention, there is provided a fault searching method for an optical line, according to the third aspect, wherein the wavelength of the test light is a value approximately 0.6 μm.

In accordance with the fourth aspect, an effect which is the same as in the third aspect described above can be achieved except for that the wavelength of the test light is specified to be a value approximately 0.6 μm.

Then, when test light with a wavelength approximately 0.6 μm is used, because the optical fiber connected as the optical line has a large backward scattering coefficient in the wavelength range approximately 0.6 μm, as a result, because the level of the signal which includes backward scattering light or return light from the optical fiber, and which is made to be incident into the OTDR, is made high, a fault search with respect to the optical line in the shortest dead zone is made possible.

Further, when test light with a wavelength approximately 0.6 μm is used, because the light receiving sensitivity with respect to the photodetector used in the transmission apparatus or the like at the center station side using the data transmission light with wavelengths of 1.31 μm and 1.55 μm is reduced by 10 dB or more, the influence upon the transmission apparatus or the like at the center station side can be reduced.

According to a fifth aspect of the present invention, there is provided a fault searching method for an optical line, according to the fourth aspect, wherein, when the wavelength of the test light is approximately 0.6 μm, an Si photodetector which indicates light receiving sensitivity in the wavelength band approximately 0.6 μm, and which hardly indicates light receiving sensitivity with respect to data transmission light with wavelengths of 1.31 μm and 1.55 μm which are used for data transmission is used as a light receiver of the OTDR.

In accordance with the fifth aspect, an effect which is the same as in the fourth aspect described above can be achieved except for that, when the wavelength of the test light is approximately 0.6 μm, an Si photodetector which indicates light receiving sensitivity in the wavelength band approximately 0.6 μm, and which hardly indicates light receiving sensitivity with respect to the data transmission light with wavelengths of 1.31 μm and 1.55 μm which are used for data transmission is used as a light receiver of the OTDR.

Then, due to the Si photodetector having such a characteristic being used as a light receiver of the OTDR, because the light receiver of the OTDR hardly indicates light receiving sensitivity with respect to the data transmission light with wavelengths of 1.31 μm and 1.55 μm which are used for data transmission, the influence of data transmission light upon the test light can be removed.

According to a sixth aspect of the present invention, there is provided a fault searching method for an optical line, according to the first aspect, wherein the test light whose peak level is less than or equal to the predetermined level is set such that the peak level is made to be −40 dBm through −50 dBm or less as a signal level of the test light at other user optical terminals or a light receiving portion of the transmission apparatus at the center side.

In accordance with the sixth aspect, an effect which is the same as in the first aspect described above can be achieved except that, from the standpoint of not influencing the other user optical terminals or the transmission apparatus at the center station side other than the user optical terminal to which the OTDR is connected, the test light is a test light set such that the peak level of the test light is made to be −40 dBm through −50 dBm or less as a signal level of the test light at the other user optical terminals or the light receiving portion of the transmission apparatus at the center station side.

Then, in this way, when the peak level of an optical pulse which will be a test light is set so as to be suppressed to the predetermined level (−40 dBm through −50 dBm) or less, the wavelength of the test light can be set at an arbitrary value regardless of a value included in one of the ranges being greater than or equal to 0.3 μm and less than 1.3 μm, and greater than 1.65 μm and less than or equal to 2.0 μm which was described above.

According to a seventh aspect of the present invention, there is provided a fault searching system for an optical line which searches a fault in an optical line connected with an optical fiber carrying out data transmission between from a transmission apparatus at a center station side via an optical divider (passive optical network [PON]) up to a user optical terminal comprising: an optical pulse tester (Optical Time Domain Reflectometer: OTDR) which carries out a test for the optical fiber based on a backward scattering light or a return light from the optical fiber by making a test light be incident into the optical fiber; means for detaching a terminal portion of the optical line at an inside of the user optical terminal from the inside of the user optical terminal, and for connecting the OTDR to the terminal portion of the optical line; means for making at least one of a test light with a wavelength different from a wavelength of a light used for data transmission in the optical line, and a test light whose peak level is less than or equal to a predetermined level be incident upon the terminal portion of the optical line from the OTDR; and means for searching a fault in the optical line from the user optical terminal side by detecting a backward scattering light or a return light from the optical line which is obtained based on the incidence of the test light by the OTDR.

In accordance with the seventh aspect, in the means for connecting the OTDR, the terminal portion of the optical line at the inside of the user optical terminal is detached from the inside of the user optical terminal, and the OTDR is connected to the terminal portion of the optical line, and in the means for making the test light be incident, at least one of the test light with a wavelength different from the wavelength of the light used for data transmission in the optical line, and the test light whose peak level is less than or equal to the predetermined level is made to be incident upon the terminal portion of the optical line from the OTDR, and in the means for searching a fault in the optical line, a fault in the optical line is searched from the user optical terminal side by detecting a backward scattering light or a return light from the optical line which is obtained based on the incidence of the test light by the OTDR, and therefore, a fault in the optical fiber laid as the optical line between from each user optical terminal up to the optical divider can be rapidly searched from the user optical terminal side without influencing the other user optical terminals and the transmission apparatus at the center station side.

According to an eighth aspect of the present invention, there is provided a fault searching system for an optical line, according to the seventh aspect, wherein the wavelength of the test light is a wavelength different from the wavelength of the light used for data transmission in the optical line, and is a wavelength different from a wavelength used for a test for the optical line from the center station side.

In accordance with the eighth aspect, an effect which is the same as in the seventh aspect described above can be achieved except for that the wavelength of the test light is a wavelength different from the wavelength of the light used for data transmission in the optical line, and is a wavelength different from a wavelength used for a test for the optical line from the center station side.

According to a ninth aspect of the present invention, there is provided a fault searching system for an optical line, according to the eighth aspect, wherein the wavelength of the test light is a value included in one of ranges being greater than or equal to 0.3 µm and less than 1.3 µm, or greater than 1.65 µm and less than or equal to 2.0 µm.

In accordance with the ninth aspect, an effect which is the same as in the seventh aspect described above can be achieved except for that, in order for the wavelength of the test light to be a wavelength different from the wavelength of the light used for data transmission in the optical line, and is a wavelength different from a wavelength used for a test for the optical line from the center station side, it is specified to be a value included in one of the ranges being greater than or equal to 0.3 µm and less than 1.3 µm, and greater than 1.65 µm and less than or equal to 2.0 µm.

In this case, the OTDR may be an OTDR equipped with a variable or a plurality of wavelength light sources which selectively generate a test light having a wavelength greater than or equal to 0.3 µm and less than 1.3 µm which is different from the wavelength of the light used for data transmission in the optical line in accordance with setting by the user, or a single light source which generates only a test light having one wavelength thereamong.

Moreover, the OTDR may be an OTDR equipped with a variable or a plurality of wavelength light sources which selectively generate a test light with a wavelength which is greater than or equal to 0.3 µm and less than 1.3 µm, or which is greater than 1.65 µm and less than or equal to 2.0 µm which is different from the wavelength of the light used for data transmission in the optical line and which is different from the wavelength used for a test for an optical line from the side of the center station in accordance with setting by the user, or a single light source which generates only a test light having one wavelength thereamong.

According to a tenth aspect of the present invention, there is provided a fault searching system for an optical line, according to the ninth aspect, wherein the wavelength of the test light is a value approximately 0.6 µm.

In accordance with the tenth aspect, an effect which is the same as in the ninth aspect described above can be achieved except for that the wavelength of the test light is specified to be a value approximately 0.6 µm.

Then, in the fault searching system for an optical line using the test light with a wavelength of a value approximately 0.6 µm, because the optical fiber connected as the optical line has a large backward scattering coefficient in the wavelength range approximately 0.6 µm, as a result, because the level of the signal which includes a backward scattering light or a return light from the optical fiber, and which is made to be incident into the OTDR is made high, a fault search with respect to the optical line in the shortest dead zone is made to be possible.

Further, in the fault searching system for an optical line using the test light with a wavelength of a value approximately 0.6 µm, because the light receiving sensitivity with respect to the photodetector used in the transmission apparatus or the like at the center station side using the data transmission lights with wavelengths of 1.31 µm and 1.55 µm is reduced by 10 dB or more, the influence upon the transmission apparatus or the like at the center station side can be reduced.

According to an eleventh aspect of the present invention, there is provided a fault searching system for an optical line, according to the tenth aspect, wherein, when the wavelength of the test light is the value approximately 0.6 µm, an Si photodetector which indicates light receiving sensitivity in the wavelength band approximately 0.6 µm, and which hardly indicate light receiving sensitivity with respect to data transmission lights with wavelengths of 1.31 µm and 1.55 µm which are used for data transmission is used as a light receiver of the OTDR.

In accordance with the eleventh aspect, an effect which is the same as in the tenth aspect described above can be achieved except for that, when the wavelength of the test light is a value approximately 0.6 µm, an Si photodetector which indicates light receiving sensitivity in the wavelength band approximately 0.6 µm, and which hardly indicate light receiving sensitivity with respect to the data transmission lights with wavelengths of 1.31 μm and 1.55 μm which are used for data transmission is used as a light receiver of the OTDR.

Then, in the fault searching system for an optical line using the Si photodetector having such a characteristic as a light receiver of the OTDR, because the light receiver of the OTDR hardly indicate light receiving sensitivity with respect to the data transmission lights with wavelengths of 1.31 μm and 1.55 μm which are used for data transmission, the influence of data transmission lights upon the test light can be removed.

According to a twelfth aspect of the present invention, there is provided a fault searching system for an optical line, according to the seventh aspect, wherein the test light whose peak level is less than or equal to the predetermined level is set such that the peak level is made to be −40 dBm through −50 dBm or less as a signal level of the test light at other user optical terminals or a light receiving portion of the transmission apparatus at the center side.

In accordance with the twelfth aspect, an effect which is the same as in the seventh aspect described above can be achieved except for that, from the standpoint of not influencing the other user optical terminals or the transmission apparatus at the center station side other than the user optical terminal to which the OTDR is connected, the test light is a test light set such that the peak level of the test light is made to be −40 dBm through −50 dBm or less as a signal level of the test light at the other user optical terminals or the light receiving portion of the transmission apparatus at the center station side.

Then, in this way, when the peak level of an optical pulse which will be a test light is set so as to be suppressed to the predetermined level (−40 dBm through −50 dBm) or less, the wavelength of the test light can be set at an arbitrary value regardless of a value included in one of the ranges of being greater than or equal to 0.3 μm and less than 1.3 μm, and being greater than 1.65 μm and less than or equal to 2.0 μm.

BEST MODE FOR CARRYING OUT THE INVENTION

Hereinafter, one embodiment of a fault searching system for an optical line according to the invention will be described with reference to the drawings.

Figure 1:
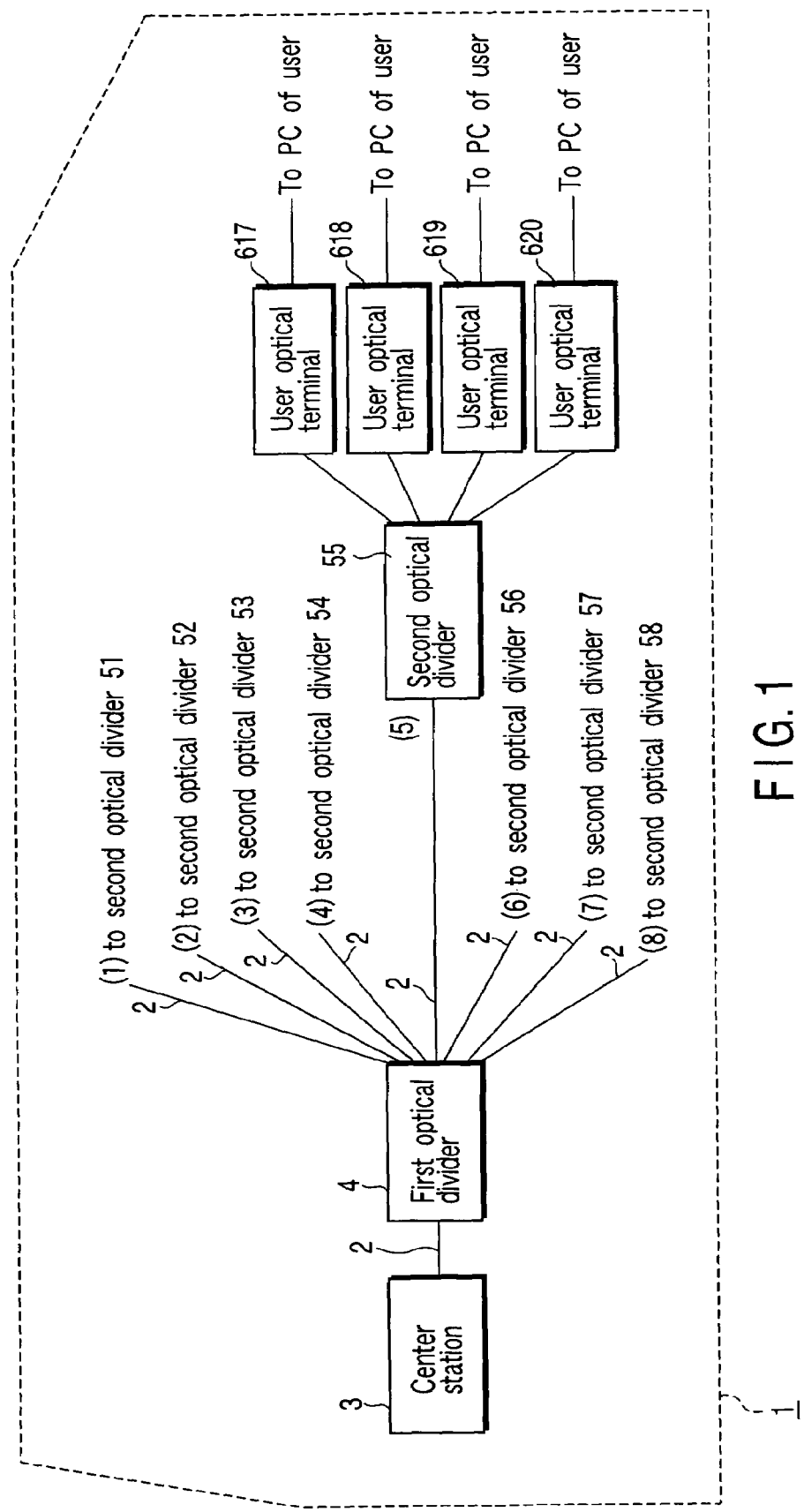
FIG. 1 is a typical diagram shown for explanation of one example of an FTTH 1 which is an applicable subject serving as one embodiment of a fault searching system for an optical line according to the invention.

FIG. 1 is a typical diagram shown for explanation of one example of an FTTH 1 which is an applicable subject serving as one embodiment of the fault searching system for an optical line according to the invention.

The applicable subject serving as one embodiment of the fault searching system for an optical line according to the invention is the FTTH 1 in accordance with a PON system as shown in FIG. 1.

The FTTH 1 is constituted of a center station 3 located at a communication carrier side and a first optical divider 4 which are connected to one another with an optical fiber 2, eight second optical dividers 51, 52, . . . , and 58 which are connected to the first optical divider 4, and a total of 32 user optical terminals which are connected by every four of those to each of the respective second optical dividers 51, 52, . . . , and 58.

Note that, in FIG. 1, from the standpoint of making an attempt to simplify the explanation, illustrations of the user optical terminals other than user optical terminals 617, 618, 619, and 620 connected to the second optical divider 55 which is the fifth from the top are omitted.

In this FTTH 1, as a light signal in the up direction, a light with a wavelength of 1.31 μm is used, and as a light signal in the down direction, a light with a wavelength of 1.55 μm is used.

Here, the up direction means a direction from the respective user optical terminals 617, 618, 619, and 620 toward the center station 3.

On the other hand, the down direction means a direction from the center station 3 toward the respective user optical terminals 617, 618, 619, and 620.

The center station 3 outputs a light signal with a wavelength of 1.55 μm in the down direction to the first optical divider 4, and receives a light signal with a wavelength of 1.31 μm in the up direction outputted from the first optical divider 4.

The first optical divider 4 receives the light signal with a wavelength of 1.55 μm transmitted from the center station 3, and divides the received light signal, and outputs those to the respective second optical dividers 51, 52, . . . , and 58.

Further, the first optical divider 4 receives the light signals with the wavelengths of 1.31 μm outputted from the respective second optical dividers 51, 52, . . . , and 58, and outputs the received light signals with the wavelength of 1.31 μm to the center station 3.

The respective second optical dividers 51, 52, . . . , and 58 are installed in the vicinities of respective users' homes, for example, at electric poles or the like, and divide the light signal with a wavelength of 1.55 μm outputted from the first optical divider 4 off fours, and output those to the respective user optical terminals 617, 618, 619, and 620 provided to the respective user sides.

Further, these second optical dividers 51, 52, . . . , and 58 receive the light signals with the wavelength of 1.31 μm outputted from the respective user optical terminals 617, 618, 619, and 620, and output the received light signals with the wavelength of 1.31 μm to the first optical divider 4.

In this case, a total of 32 respective user optical terminals are respectively installed in the respective users' homes, and receive the light signals with the wavelength of 1.55 μm outputted from the respective second optical dividers 51, 52, . . . , and 58, and photoelectrically convert the received light signals, and output digital signals which are obtained as a result of the photoelectric conversion to unillustrated computers (PCs) of the respective users.

Further, the respective user optical terminals convert the digital signals transmitted from the unillustrated computers (PCs) of the respective users into light signals with the wavelength of 1.31 μm, and output the output light signals with the wavelength of 1.31 μm to the second optical dividers 51, 52, . . . , and 58.

Figure 2:
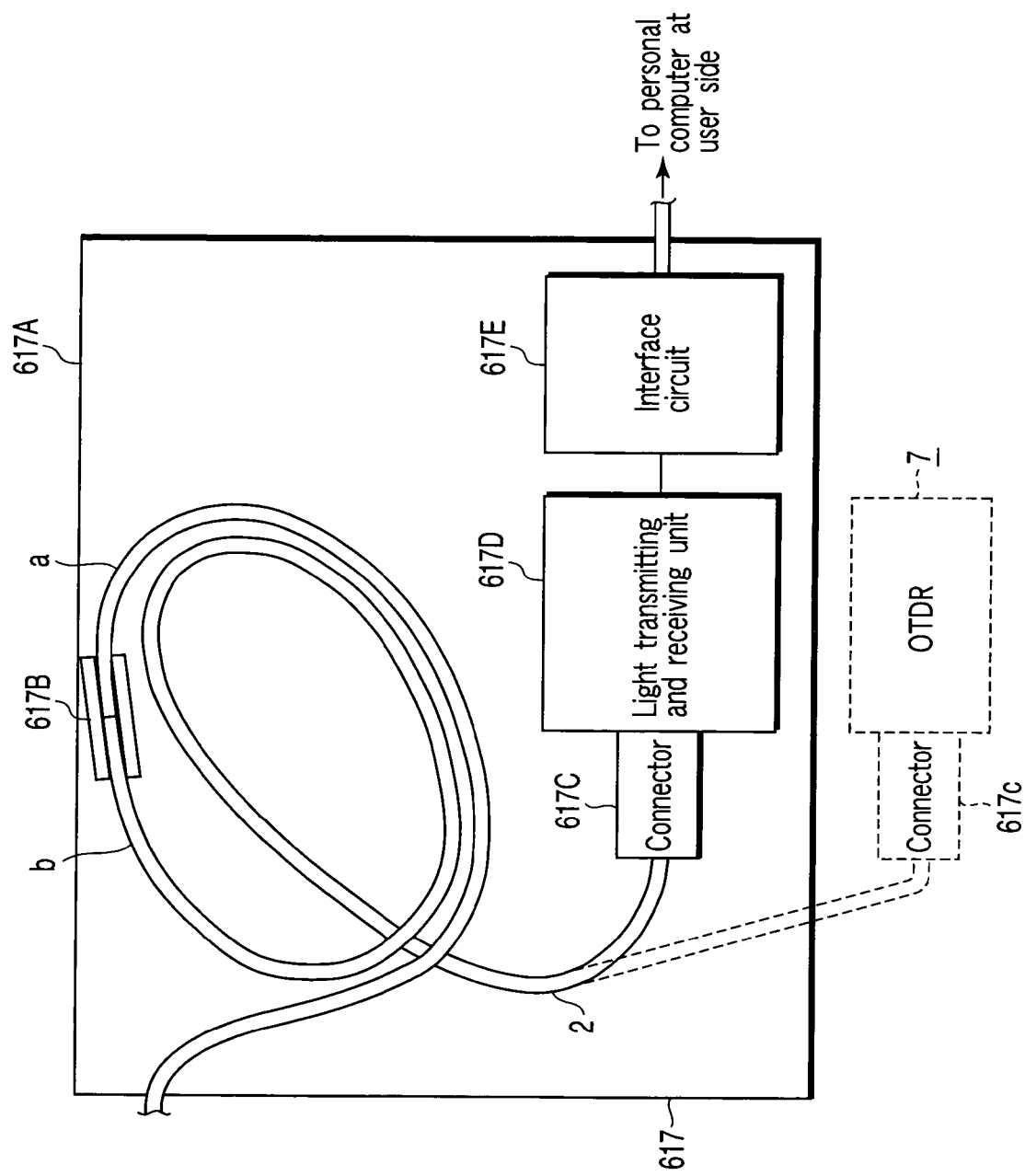
FIG. 2 is a typical diagram shown for explanation of one example of a user optical terminal which is an applicable subject serving as one embodiment of the fault searching system for an optical line according to the invention.

FIG. 2 is a typical diagram shown for explanation of one example of a user optical terminal which is an applicable subject serving as one embodiment of the fault searching system for an optical line according to the invention.

A total of the 32 respective user optical terminals which are the applicable subjects serving as one embodiment of the fault searching system for an optical line according to the invention respectively insert optical fibers 2 connected to the second optical dividers 51, 52, . . . , and 58 into the insides thereof every fours.

Note that, in the following explanations, from the standpoint of making an attempt to simplify the explanations, only the user optical terminal 617 will be described. However, it goes without saying that the other user optical terminals have the same configurations.

The user optical terminal 617 is constituted of a substantially rectangular parallelopiped housing 617A, the optical fiber 2 whose base end portion is connected to the second optical divider 55, a mechanical splice 617B, a connector 617C connected to a terminal portion of the optical fiber 2, an light transmitting and receiving unit 617D, and an interface circuit 617E.

Here, the housing 617A is for housing the light transmitting and receiving unit 617D and the interface circuit 617E in the inside thereof, and for housing the optical fiber 2 so as to be wound round.

The base end portion of the optical fiber 2 is connected to the second optical divider 55 of FIG. 1, and the terminal portion thereof is housed so as to be wound round at the inside of the housing 617A.

The mechanical splice 617B is a member for connecting so as to mechanically put respective end portions of the two optical fibers at the inside of the housing 617A of the user optical terminal 617 therebetween.

The connector 617C is connected to the terminal portion of the optical fiber 2 at the inside of the user optical terminal 617, and is connected to the light transmitting and receiving unit 617D.

An unillustrated filter for eliminating a light with a wavelength of 1.65 μm used at the time of a transmission test for the optical fiber 2 which is executed from the side of the center station 3 is built into the connector 617C.

The light transmitting and receiving unit 617D is connected to the connector 617C connected to the terminal portion of the optical fiber 2, and converts a light which has propagated inside the optical fiber 2 into a digital signal, and outputs the converted digital signal to an unillustrated computer (PC) of a user via the interface circuit 617E.

Further, the light transmitting and receiving unit 617D converts a data signal transmitted from the external unillustrated computer (PC) of the user via the interface circuit 617E into a light signal, and outputs the converted light signal to the second optical divider 55 of FIG. 1 via the connector 617C and the optical fiber 2.

The interface circuit 617E outputs the digital signal outputted from the light transmitting and receiving unit 617D to the unillustrated personal computer (PC) at the user side connected via an unillustrated LAN.

Further, the interface circuit 617E outputs the data signal outputted from the unillustrated personal computer (PC) at the user side to the light transmitting and receiving unit 617D.

Note that an OTDR 7 of FIG. 3 which will be described later and which is used in the embodiment of the fault searching system for an optical line according to the invention is connected to the connector 617C which has been detached from the light transmitting and receiving unit 617D as shown by broken lines in the drawing.

Figure 3:
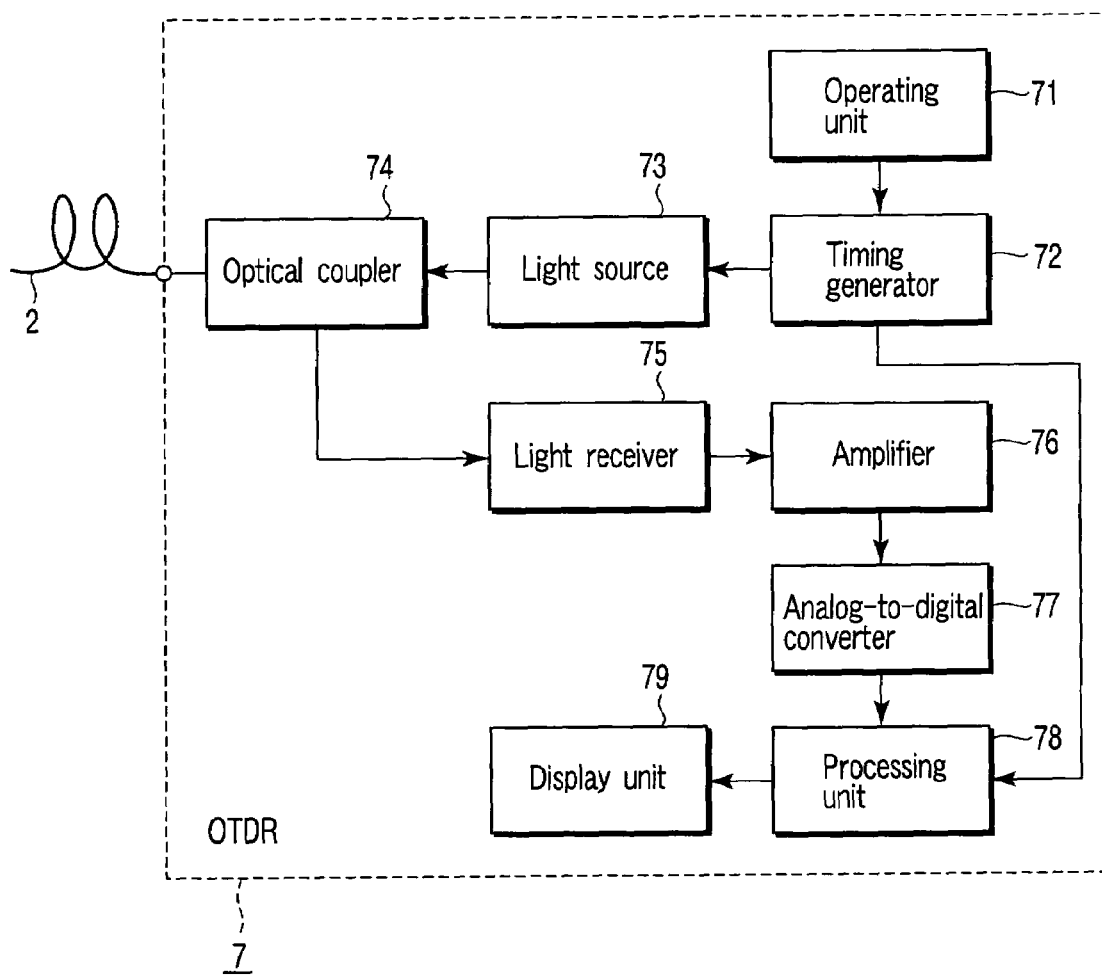
FIG. 3 is a functional block diagram shown for explanation of a configuration of an OTDR used for one embodiment of the fault searching system for an optical line according to the invention.

FIG. 3 is a functional block diagram shown for explanation of a configuration of the OTDR 7 used for the embodiment of the fault searching system for an optical line according to the invention.

This OTDR 7 is constituted of an operating unit 71, a timing generator 72 connected to the operating unit 71, a light source 73 connected to the timing generator 72, an optical coupler 74 connected to the light source 73, a light receiver 75 connected to the optical coupler 74, an amplifier 76 connected to the light receiver 75, an analog/digital (A/D) converter 77 connected to the amplifier 76, a processing unit 78 connected to the A/D converter 77 and the timing generator 72, and a display unit 79 connected to the processing unit 78.

Here, at the operating unit 71, a wavelength of an optical pulse emitted from the light source 73 is set at a desired value by an operation of an operator, and data of a repeating period thereof is inputted thereto.

Note that, in the OTDR 7 according to the present embodiment, the operating unit 71 has a function in which a wavelength and a pulse width of an optical pulse emitted from the light source 73 is set at a desired value by an operation of an operator, and data for setting a repeating period thereof to a desired value is inputted thereto.

However, it is not limited thereto, the operating unit 71 may have a function such that data for setting a peak level of an optical pulse emitted from the light source 73 so as to be suppressed to a predetermined level or less is inputted by an operation of an operator.

Further, the timing generator 72 transmits a timing signal to the light source 73 such that an optical pulse having a predetermined wavelength and a pulse width is generated at a predetermined repeating period from the light source 73 based on the data for setting which has been inputted from the operating unit 71.

For example, the light source 73 formed from a laser diode generates an optical pulse having a wavelength and a pulse width corresponding to the inputted data for setting the wavelength and pulse width, at a repeating period corresponding to the inputted data for setting the repeating period, and outputs it as a test light to one end of the optical fiber 2 via the optical coupler 74.

The wavelength of the optical pulse serving as a test light is set at a value different from the wavelength of a transmission light used in the actual optical communication system, for example, 0.6 μm.

Note that, in the present embodiment, the wavelength of the optical pulse serving as a test light outputted from the light source 73 is set at 0.6 μm. However, it is not limited thereto.

Namely, the wavelength of the optical pulse serving as a test light outputted from the light source 73 may be a value greater than 1.31 μm, for example, 1.45 μm.

In this case, it is configured such that a filter for eliminating an optical pulse with a wavelength of 1.45 μm is separately provided in the center station 3 which the communication carrier has which was described above.

The optical pulse serving as a test light incident upon the optical fiber 2 which is a measuring subject is made to propagate toward the second optical divider 55 at the inside of the optical fiber 2.

In the process of propagating the optical pulse serving as a test light, a backward scattering light or a return light which is caused by backward scattering or Fresnel reflection, and whose progressing direction is a reverse direction to the optical pulse serving as a test light is generated at the inside of the optical fiber 2.

The backward scattering light or the return light propagates inside the optical fiber 2, and is made to be incident into the OTDR 7 from the one end of the optical fiber 2.

The optical coupler 74 in the OTDR 7 outputs the backward scattering light or the return light made to be incident into the OTDR 7 to the light receiver 75.

The light receiver 75 receives the backward scattering light or return light which has been returned from the optical fiber 2, and converts the received backward scattering light or return light into electric signal, and outputs the converted electric signal to the amplifier 76.

Figure 5:
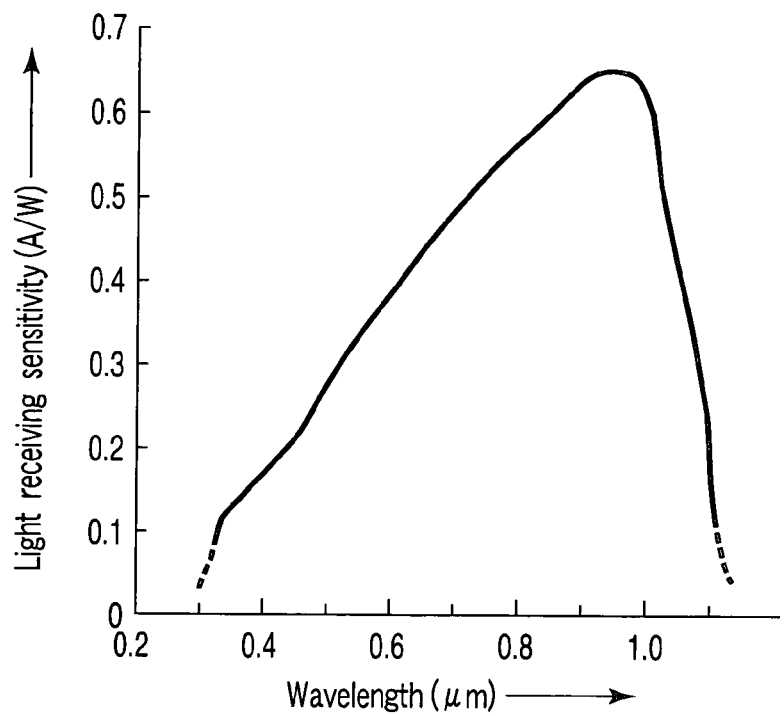
FIG. 5 is a characteristic diagram shown for explanation of light receiving sensitivity of a photodetector used for a light receiver of the OTDR used in one embodiment of the fault searching system for an optical line according to the invention.

Note that, as a photodetector used in the light receiver 75 of the OTDR 7 according to the present embodiment, when an optical pulse with a wavelength of 0.6 μm (0.63 μm or 0.65 μm as well is available) is used as a test light, for example, as shown in FIG. 5, it is assumed that an Si-PIN photodiode which is an Si photodetector indicating satisfactory light receiving sensitivity in a wavelength band which is approximately 0.6 μm (about 0.4 μm through about 0.95 μm), or the like is used.

Because the light receiver 75 using the photodetector having such a characteristic hardly indicate light receiving sensitivity with respect to the data transmission lights with the wavelengths of 1.31 μm and 1.55 μm used in the FTTH 1, there is no influence of the data transmission lights with respect to the test light.

Then, the amplifier 76 amplifies the electric signal outputted from the light receiver 75, and outputs the amplified electric signal to the A/D converter 77.

The A/D converter 77 A/D converts the electric signal outputted from the amplifier 76, and outputs the A/D converted electric signal to the processing unit 78.

The processing unit 78 has a function in which after processing in which a trigger synchronized with a pulse inputted from the timing generator 72b is received, and measurement data included in the electric signal outputted from the A/D converter 77 are averaged is carried out, logarithmic conversion is carried out, and a transmission characteristic of the optical fiber 2 with respect to a test light is calculated, and a function of displaying the calculated transmission characteristic of the optical fiber 2 on the display unit 79.

The display unit 79 displays the transmission characteristic of the optical fiber 2 calculated by the processing unit 78.

Next, operations of the fault searching system of the optical fiber 2 using the OTDR 7 configured as described above will be described with reference to a flowchart showing in FIG. 4.

Figure 4:
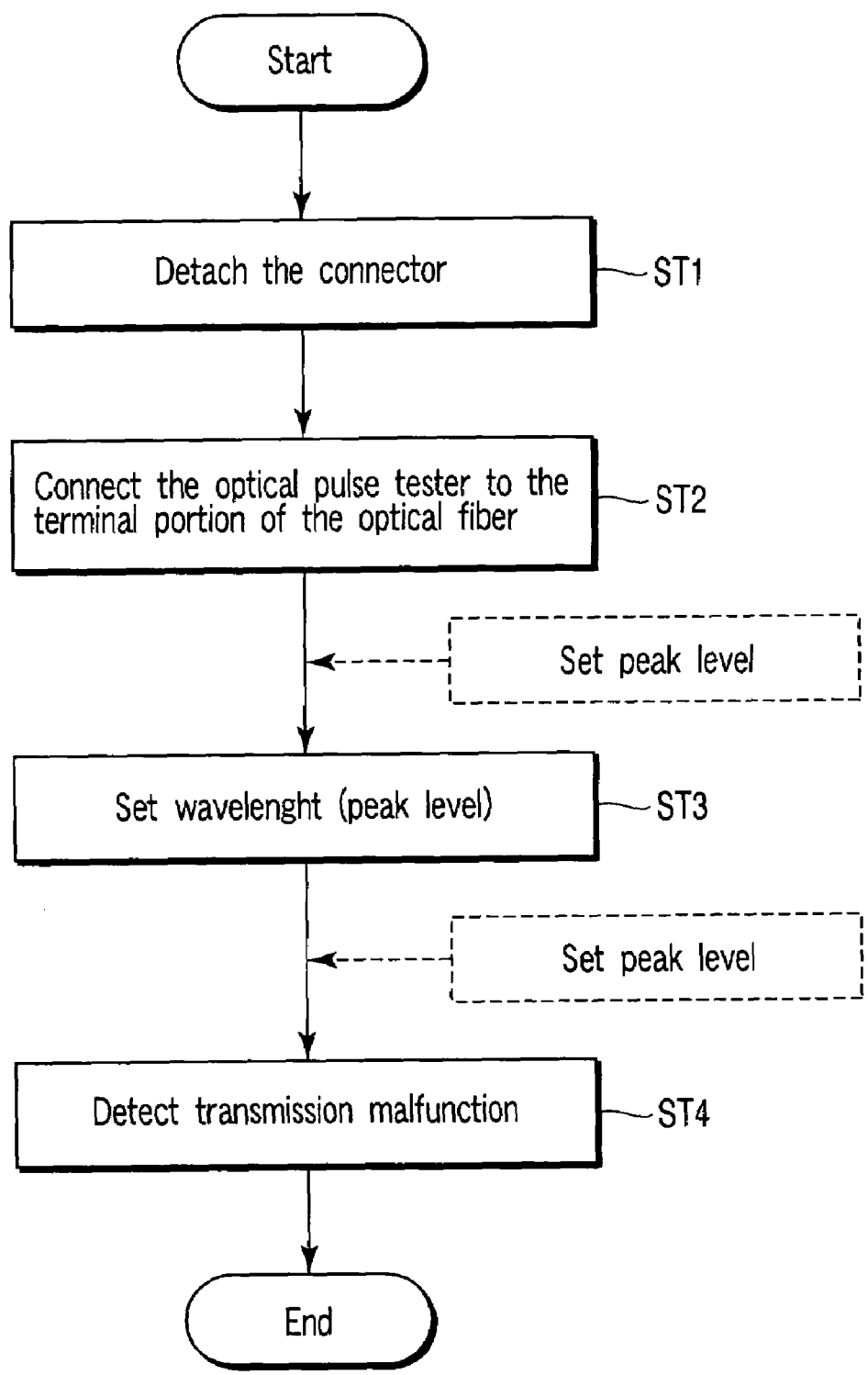
FIG. 4 is a flowchart shown for explanation of operations of one embodiment and other embodiments of the fault searching system for an optical line according to the invention.

FIG. 4 is the flowchart shown for explanation of the operations of the fault searching system for an optical line according to the invention.

First, the operator detaches the connector 617C connecting the terminal portion of the optical fiber 2 in the user optical terminal 617 and the light transmitting and receiving unit 617D, from the light transmitting and receiving unit 617D as shown by the broken lines in FIG. 2 (step ST1).

Next, the operator connects the OTDR 7 to the terminal portion of the optical fiber 2 at the inside of the user optical terminal 617 by connecting the OTDR 7 to the connector 617C detached from the light transmitting and receiving unit 617D (step ST2).

Note that, in the present embodiment, although the OTDR 7 is connected to the terminal portion of the optical fiber 2 at the inside of the user optical terminal 617, it is not limited thereto.

For example, the mechanical splice 617B connecting the optical fibers 2 at the inside of the user optical terminal 617 may be detached, and the OTDR 7 may be connected to one end a of the optical fiber 2 from which the mechanical splice 617B is detached.

Note that, in this case, the wavelength of the test light used in the OTDR 7 may be 1.65 μm which is the same as the wavelength of the test light which is made to be incident from the side of the center station 3 at the time of detecting a fault in the optical fiber 2.

Namely, in this case, the reason for this is that, because it is configured such that the test light is made to be incident into the optical fiber 2 without using the connector 617C, there is no influence by the filter for eliminating a light with a wavelength of 1.65 μm used at the time of a transmission test for the optical fiber 2 which is executed from the side of the center station 3 built-in in the connector 617C.

Next, the operator sets the wavelength of the test light used in the OTDR 7 to an arbitrary value different from 1.31 μm and μm 1.55 μm used for transmission, for example, 0.6 μm (step ST3).

Note that, in the present embodiment, although the wavelength of the test light used in the OTDR 7 is set at 0.6 μm, it is not limited thereto.

For example, the wavelength of the test light set in the OTDR 7 may be 0.63 μm or 0.65 μm, and as a whole, it is more preferable that it is a value included in one of the ranges of being greater than or equal to 0.3 μm and less than 1.3 μm, and being greater than 1.65 μm and less than or equal to 2.0 μm.

This is because from the standpoint of not affecting the other user optical terminals using transmission lights with the wavelengths of 1.31 μm and 1.55 μm, and for avoiding the wavelength 1.65 μm of the test light used at the time of detecting a fault in the optical fiber 2 from the side of the center station 3.

Note that, the light source 73 equipped in the OTDR 7 may be a variable or a plurality of wavelength light sources which selectively generate a test light having a wavelength greater than or equal to 0.3 μm and less than 1.3 μm which is different from the wavelength of the light used for data transmission in the optical line in accordance with setting by the user, or a single light source which generates only a test light having one wavelength thereamong.

Further, the light source 73 equipped in the OTDR 7 may be a variable or a plurality of wavelength light sources which selectively generate a test light with a wavelength which is greater than or equal to 0.3 μm and less than 1.3 μm, or which is greater than 1.65 μm and less than or equal to 2.0 μm which is different from the wavelength of the light used for data transmission in the optical line and which is different from the wavelength used for a test for an optical line from the side of the center station in accordance with setting by the user, or a single light source which generates only a test light having one wavelength thereamong.

Note that, when the light source 73 equipped in the OTDR 7 is a single light source which generates only a test light having one wavelength of the wavelength which is greater than or equal to 0.3 μm and less than 1.3 μm, or which is a wavelength greater than 1.65 μm and less than or equal to 2.0 μm, naturally, the process of setting the wavelength of the test light (step ST3) can be omitted.

Note that, in the present embodiment, at step ST3, although the wavelength of the test light set in the OTDR 7 is set at an arbitrary value different from 1.3 μm and 1.55 μm used for a transmission light, for example, 0.6 μm, it is not limited thereto.

The process of setting the wavelength of the test light at step ST3 may be replaced with a process of setting a peak level of an optical pulse which will be a test light so as to be suppressed to a predetermined level (−40 dBm through −50 dBm) or less.

This is because, from the standpoint that the test light according to the present embodiment does not affect the other user optical terminals or the transmission apparatus at the center side in the FTTH 1 other than the user optical terminal 617 to which the OTDR 7 is connected, it is most preferable from the actual empirical fact at the maintenance job site that the peak level of an optical pulse which will be a test light the signal level of the test light at the other user optical terminals or the light receiving portion of the transmission apparatus at the center side is a value within a range of −40 dBm through −50 dBm or less.

Then, in this way, when the peak level of an optical pulse which will be a test light is set so as to be suppressed to the predetermined level (−40 dBm through −50 dBm) or less, the wavelength of the test light can be set at an arbitrary value regardless of a value included in one of the ranges of being greater than or equal to 0.3 μm and less than 1.3 μm, and being greater than 1.65 μm and less than or equal to 2.0 μm.

Further, as shown by the broken lines in FIG. 4, a process in which the peak level of an optical pulse which will be a test light is set so as to be suppressed to the predetermined level (−40 dBm through −50 dBm) or less may be added to one of the front and rear of the process in which the wavelength of the test light is set at an arbitrary value different from 1.31 μm and 1.55 μm used for a transmission lights (step ST3).

Next, the operator carries out a search for a fault in the optical fiber 2 due to the test light whose wavelength is set at, for example, 0.6 μm being made to be incident from the connector 617C connected to the terminal portion of the optical fiber 2, by using the OTDR 7 (step ST4).

In accordance with a series of the processes as described above, a searching test for a fault with respect to the optical fiber 2 from the user optical terminal 617 side is completed.

As described above, in accordance with the present embodiment, because the connector 617C provided at the terminal portion of the optical fiber 2 in the user optical terminal 617 is detached from the light transmitting and receiving unit 617D, and the OTDR 7 is connected to the detached connector 617C, and at least one of the test light which has been set at a value different from the wavelength of the light used for data transmission and the test light which has been set so as to be suppressed to the predetermined level (−40 dBm through −50 dBm) or less is made to be incident into the optical fiber 2 via the connector 617C, a fault in the optical fiber 2 laid as an optical line from the user optical terminal 617 up to the second optical divider 55 can be rapidly and exactly searched from the user optical terminal 617 side without affecting the other user optical terminals and the transmission apparatus at the side of the center station.

Then, in the present embodiment, when an optical pulse with a wavelength of 0.6 μm (even 0.63 μm or 0.65 μm is available) is used, because the optical fiber has a large backward scattering coefficient in this wavelength range, as a result, because the level of the signal which includes a backward scattering light or a return light from the optical fiber 2, and which is made to be incident into the OTDR 7 is made to be high, a fault search with respect to the optical fiber 2 in the shortest dead zone is made to be possible.

Figure 6:
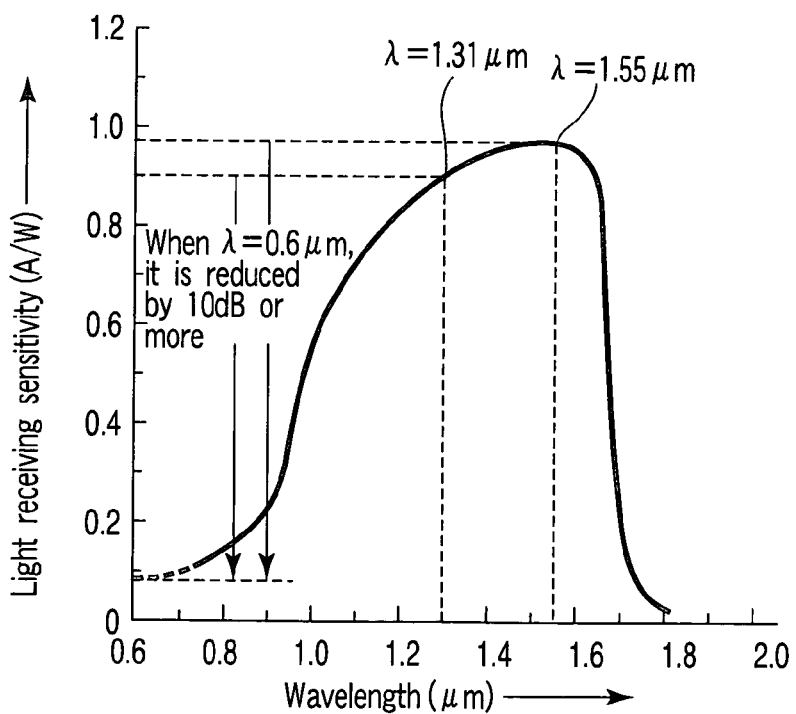
FIG. 6 is a characteristic diagram shown for explanation of light-receiving sensitivity of a photodetector used for an FTTH 1 network which is an applicable subject serving as one embodiment of the fault searching system for an optical line according to the invention.

By the way, as a photodetector used in the FTTH 1 in accordance with a PON system, because data transmission lights with the wavelengths of 1.31 μm and 1.55 μm are used in the FTTH 1, for example, as shown in FIG. 6, an InGaAs-PIN photodiode using InGaAs showing satisfactory light receiving sensitivity within a wavelength band which is approximately about 1.0 μm through 1.65 μm as a material, or the like is used.

In the present embodiment, when a test light with a wavelength which is approximately 0.6 μm (even 0.63 μm or 0.65 μm is available other then 0.6 μm) is used, because the light receiving sensitivity of the test light with a wavelength which is approximately 0.6 μm with respect to the photodetector used in the FTTH 1 using the data transmission lights with wavelengths of 1.31 μm and 1.55 μm is reduced by 10 dB or more as shown in FIG. 6, the influence upon the FTTH 1 network can be reduced.

Note that the present invention is not limited to the above-described embodiment as is, and structural requirements can be modified and materialized within a range which does not deviate from the gist of the present invention at the practical phase, and various inventions can be sampled and formed due to the plurality of structural requirements which have been disclosed in the above-described embodiment being appropriately combined.

For example, several structural requirements may be eliminated from all of the structural requirements shown in the embodiment, and moreover, structural requirements over different embodiments may be appropriately combined.

As described above in detail, in accordance with the present embodiment, a fault searching system for an optical line which can rapidly search a fault in an optical fiber laid as an optical line from a user optical terminal up to an optical divider from the user optical terminal side can be provided.

The invention claimed is:

1. A fault searching method for an optical line which searches for a fault in an optical line connected with an optical fiber carrying out data transmission between from a transmission apparatus at a center station side via an optical divider such as a passive optical network (PON) up to a user optical terminal comprising:
preparing an optical time domain reflectometer (OTDR) which carries out a test for the optical fiber based on backward scattering light or return light from the optical fiber by making test light be incident into the optical fiber;
detaching a terminal portion of the optical line at an inside of the user optical terminal from the inside of the user optical terminal, and connecting the OTDR to the terminal portion of the optical line;

making at least one of test light with a wavelength different from a wavelength of light used for data transmission in the optical line, and test light whose peak level is less than or equal to a predetermined level be incident upon the terminal portion of the optical line from the OTDR; and searching for a fault in the optical line from the user optical terminal side by detecting backward scattering light or return light from the optical line which is obtained based on the incidence of the test light by the OTDR.

2. A fault searching method for an optical line, according to claim 1, wherein
the wavelength of the test light is a wavelength different from the wavelength of the light used for data transmission in the optical line, and is a wavelength different from a wavelength used for a test for the optical line from the center station side.

3. A fault searching method for an optical line, according to claim 2, wherein
the wavelength of the test light is a value included in one of ranges being greater than or equal to 0.3 μm and less than 1.3 μm, or greater than 1.65 μm and less than or equal to 2.0 μm.

4. A fault searching method for an optical line, according to claim 3, wherein
the wavelength of the test light is a value approximately 0.6 μm.

5. A fault searching method for an optical line, according to claim 4, wherein
when the wavelength of the test light is the value approximately 0.6 μm, an Si photodetector which indicates light receiving sensitivity in the wavelength band approximately 0.6 μm, and which hardly indicates light receiving sensitivity with respect to data transmission lights with wavelengths of 1.31 μm and 1.55 μm which are used for data transmission is used as a light receiver of the OTDR.

6. A fault searching method for an optical line, according to claim 1, wherein
the test light whose peak level is less than or equal to the predetermined level is set such that the peak level is made to be −40 dBm through −50 dBm or less as a signal level of the test light at other user optical terminals or a light receiving portion of the transmission apparatus at the center side.

7. A fault searching system for an optical line which searches for a fault in an optical line connected with an optical fiber carrying out data transmission between from a transmission apparatus at a center station side via an optical divider such as a passive optical network (PON) up to a user optical terminal comprising:
an optical time domain reflectometer (OTDR) which carries out a test for the optical fiber based on backward scattering light or return light from the optical fiber by making test light be incident into the optical fiber;

means for detaching a terminal portion of the optical line at an inside of the user optical terminal from the inside of the user optical terminal, and for connecting the OTDR to the terminal portion of the optical line;

means for making at least one of test light with a wavelength different from a wavelength of light used for data transmission in the optical line, and test light whose peak level is less than or equal to a predetermined level be incident upon the terminal portion of the optical line from the OTDR; and means for searching for a fault in the optical line from the user optical terminal side by detecting backward scattering light or return light from the optical line which is obtained based on the incidence of the test light by the OTDR.

8. A fault searching system for an optical line, according to claim 7, wherein
the wavelength of the test light is a wavelength different from the wavelength of the light used for data transmission in the optical line, and is a wavelength different from a wavelength used for a test for the optical line from the center station side.

9. A fault searching system for an optical line, according to claim 8, wherein
the wavelength of the test light is a value included in one of ranges being greater than or equal to 0.3 μm and less than 1.3 μm, or greater than 1.65 μm and less than or equal to 2.0 μm.

10. A fault searching system for an optical line, according to claim 9, wherein
the wavelength of the test light is a value approximately 0.6 μm.

11. A fault searching system for an optical line, according to claim 10, wherein
when the wavelength of the test light is the value approximately 0.6 μm, an Si photodetector which indicates light receiving sensitivity in the wavelength band approximately 0.6 μm, and which hardly indicates light receiving sensitivity with respect to data transmission lights with wavelengths of 1.31 μm and 1.55 μm which are used for data transmission is used as a light receiver of the OTDR.

12. A fault searching system for an optical line, according to claim 7, wherein
the test light whose peak level is less than or equal to the predetermined level is set such that the peak level is made to be −40 dBm through −50 dBm or less as a signal level of the test light at other user optical terminals or a light receiving portion of the transmission apparatus at the center side.

* * * * *